United States Patent [19]
Hansson

[11] 4,167,355
[45] Sep. 11, 1979

[54] ATTACHMENT DEVICE AND ASSEMBLY
[75] Inventor: Erik G. Hansson, Sandhem, Sweden
[73] Assignee: Svenska Kram AB, Falköping, Sweden
[21] Appl. No.: 877,744
[22] Filed: Feb. 14, 1978
[51] Int. Cl.² .............................................. F16B 2/14
[52] U.S. Cl. .................................... 403/374; 403/379; 403/409
[58] Field of Search ............... 403/374, 379, 409, 399, 403/395, 398, 378, 319

[56] References Cited

U.S. PATENT DOCUMENTS

| | | | |
|---|---|---|---|
| 842,271 | 1/1907 | Tebbetts | 403/355 |
| 1,021,185 | 3/1912 | Foster | 5/289 |
| 1,417,161 | 5/1922 | Fuegel et al. | 403/355 X |

FOREIGN PATENT DOCUMENTS

| | | | |
|---|---|---|---|
| 814353 | 9/1951 | Fed. Rep. of Germany | 403/374 |
| 456929 | 4/1950 | Italy | 403/379 |
| 334776 | 1/1959 | Switzerland | 403/379 |
| 431926 | 7/1935 | United Kingdom | 403/399 |

Primary Examiner—Andrew V. Kundrat
Attorney, Agent, or Firm—Cushman, Darby & Cushman

[57] ABSTRACT

An attachment device and assembly for effecting connection and disconnection between component parts in a simple but reliable manner. A first structure includes first and second substantially parallel spaced apart plates, a conically-shaped, conically threaded member having a given cone angle attaching the first structure to a second structure which operatively abuts the first structure. Each plate has an aperture formed in it, the apertures being larger than the cross-sectional area of the threaded member portions being received thereby, and the second structure having a surface portion operatively abutted by the threaded member so that forces are applied tending to push the surface portion and aperture edges apart. The angle formed between a line tangent to the aperture edges and a line in the plane of the surface portion is equal to the cone angle of the threaded member.

16 Claims, 14 Drawing Figures

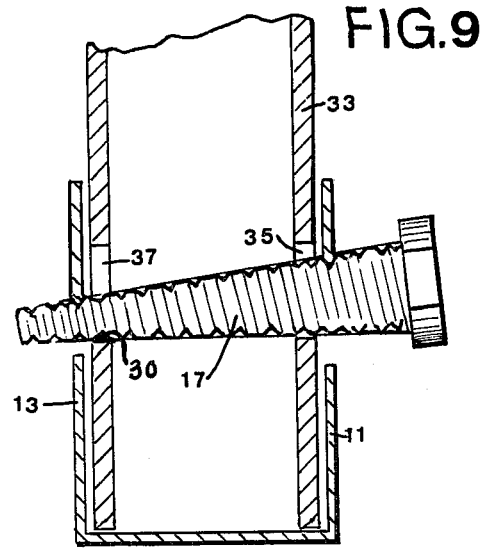
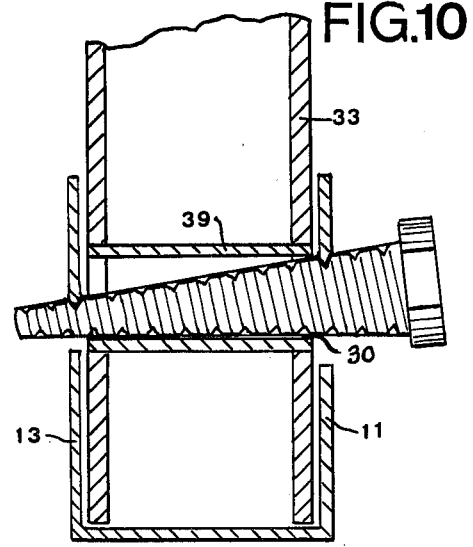
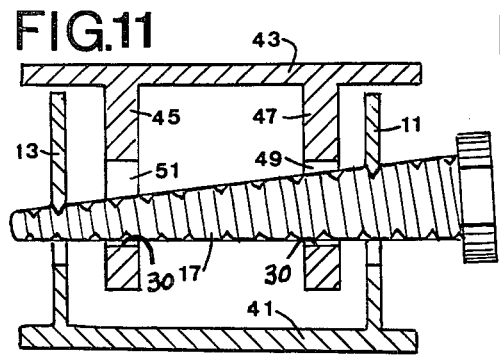
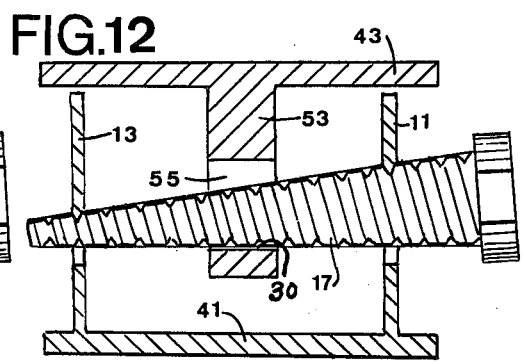
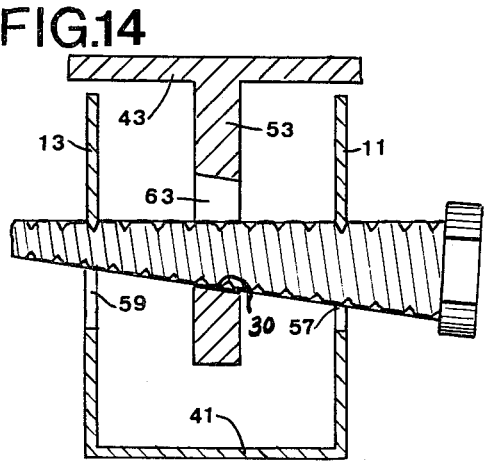
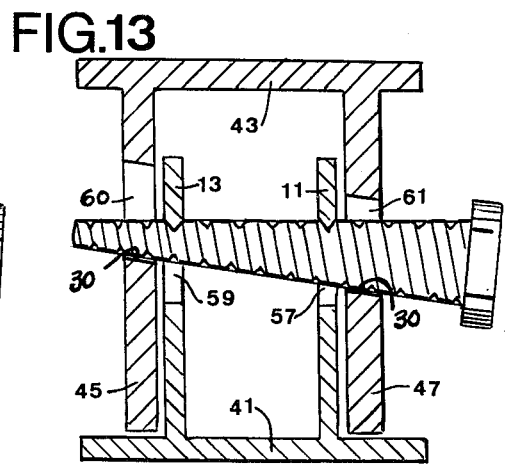

ATTACHMENT DEVICE AND ASSEMBLY

BACKGROUND AND SUMMARY OF THE INVENTION

The invention relates to an assembly and device for providing attachment between two objects, such as machine parts. According to the present invention the components can be connected and disconnected simply, yet the connection therebetween is reliable. A wide variety of objects can be attached together practicing the present invention, the attachment having many of the advantages associated with threaded connections (such as fine adjustability and secure attachment), but few of the disadvantages, (no long threaded bores being necessary, and reciprocal movement without rotation being possible over the majority of the length of the fastening movement).

According to the present invention an assembly is provided that includes a first structure, a second structure, and means for attaching the structures together. The first structure includes first and second substantially parallel spaced-apart plates with means defining an aperture in each of the first and second plates. The aperture-defining means includes edge means for each of the first and second apertures for engaging grooves of a conically threaded member and allowing longitudinal displacement of the threaded member upon rotation when in engagement with the edge means. A line perpendicular to the plates passes through the first and second apertures.

The second structure operatively abuts the first structure and has a planar surface portion, a line in the plane of the surface portion passing through both the first and second apertures of the first structure.

The attachment means prevents substantial relative movement between the first and second structures by applying forces to the edge means and surface portion tending to push the surface portion and the edge means apart. Such attachment means includes a conically-shaped, conically-threaded member having a given cone angle, and adapted to engage the edge means and to operatively abut the surface portion. The threaded member is longer than the distance between the parallel plates.

The first aperture is shaped to receive the threaded member and has an area larger than at least the smallest cross-sectional area of the threaded member, and the second aperture is also shaped to receive the threaded member and has an area larger than the cross-sectional area of the threaded member portion adjacent thereto when a portion of the threaded member is received by the first aperture. Thus, the threaded member can be at least partially introduced through the apertures by a mere longitudinal movement, without rotation. The angle formed between a line tangent to the edge means and a line in the plane of the surface portion is equal to the cone angle of the threaded member (preferably about 5 to 10 degrees).

An attachment device according to the present invention consists of the first structure spaced-apart parallel plates, with the cross member rigidly interconnecting the plates, and the threaded member. The angle formed between a line tangent to the edge means and a line passing through one of the edge means and perpendicular to the plates is between zero degrees and the cone angle, depending upon the configuration of the structure to which attachment is to be made.

Preferably, the threaded member is threaded over substantially its entire length, the thread having a uniform pitch, and having flattened thread ridges for engagement of the surface portion of the second structure. The exact positioning of the first and second apertures in the first and second plates will depend upon the configuration of the second structure to be attached thereto.

It is the primary object of the present invention to provide an attachment assembly for simply and easily effecting attachment between first and second structures. This and other objects of the invention will become clear from an inspection of the detailed description of the invention, and from the appended claims.

BRIEF DESCRIPTION OF THE DRAWINGS

FIGS. 9 through 13 are vertical sectional views of exemplary alternative assemblies according to the present invention, having first and second structures of various configuration.

DETAILED DESCRIPTION OF THE INVENTION

Figure 1:
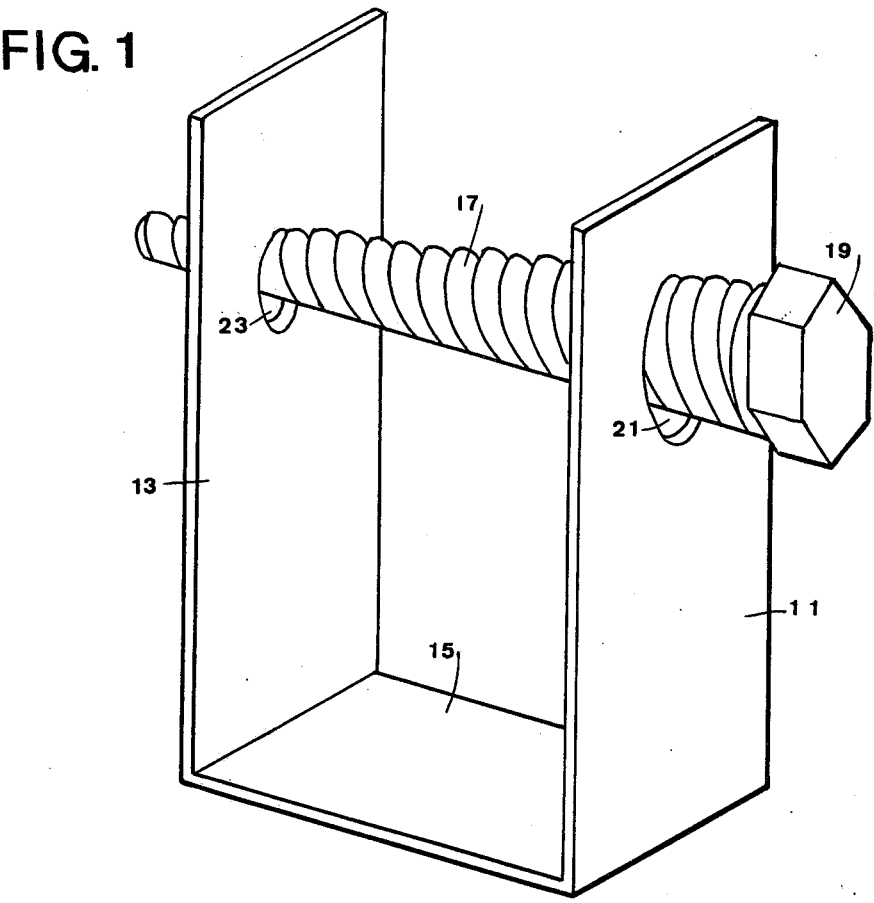
FIG. 1 is a perspective view of an exemplary embodiment of an attachment device according to the invention.

An exemplary attachment device according to the present invention is illustrated schematically in FIG. 1. The device includes a first structure having first and second substantially parallel spaced-apart plates 13, 11 respectively, with a cross member 15 rigidly interconnecting the plates 13, 11. The cross member 15 may be fastened to any desired structure, for example it may be fastened by bolts to a support structure such as a wall or a beam, or it may be integral with the support structure. A conically-shaped, conically-threaded member 17 having a given cone angle v (see FIG. 3) and a head portion 19 is also provided. Means defining apertures 23, 21 in the first and second plates 13, 11 respectively include edge means 23', 21' respectively for engaging grooves 27 of the threaded member 17 and allowing longitudinal displacement of the member 17 upon rotation thereof when in engagement with said edge means 23', 21'. The continuous helical groove 27 is cut in the conical surface of the member 17, such cutting simultaneously forming and leaving a continuous helical ridge 28. The tops of the ridges 28 preferably are flattened (as shown in FIGS. 2 and 6 through 8) so that they slide against any surface which they might engage, and this is particularly important where the second structure (i.e. 25) that is to be attached to the first structure is coated or finished. If desired, a protective layer may be interposed between the threaded member and the second structure (i.e. 25), however.

A line C (see FIG. 3) perpendicular to the plates 13, 11 passes through both apertures, and the member 17 is long enough to span the distance between the plates 13, 11 extending through apertures 23, 21 therein. The first aperture 23 is shaped to receive the threaded member 17 and has an area substantially larger than at least the smallest cross-sectional area of the member 17, while the second aperture 21 is shaped to receive the member 17 and has an area larger than the cross-sectional area of the threaded member portion adjacent thereto when a portion of the threaded member is received by the first aperture 23; such relative dimensions between the threaded member 17 and the apertures 23, 21 is illustrated clearly in FIG. 1, and in FIGS. 4 and 5. The angle formed between a line B tangent to the edge means 23', 21' and a line passing through one of the edge means and perpendicular to the plates 13, 11 (i.e. a line parallel to line C) is between zero degrees and the cone angle v.

The assembly according to the present invention includes the first structure, the threaded member 17, and a second structure shown variously at 25, 33, and 43 in the drawings. The second structure operatively abuts the first structure and has a generally planar surface portion 30 thereof, a line in the plane of the surface portion 30 passing through both the first and second apertures 23, 21. The angle formed between a line tangent to the edge means (B in FIG. 3) and a line in the plane of the surface portion 30 (C in FIG. 3) is equal to the cone angle v of the threaded member.

The threaded member 17 comprises means for attaching the first and second structures together so that substantial relative movement therebetween is prevented, by applying forces to the edge means 23', 21' and surface portion 30 tending to push the surface portion 30 and the edge means 23', 21' apart. That is, that a reaction force from the second structure causes the groove 27 of the threaded member 17 to remain in contact with the edge means 23', 21' once the member 17 is tightened into place.

Figure 3:
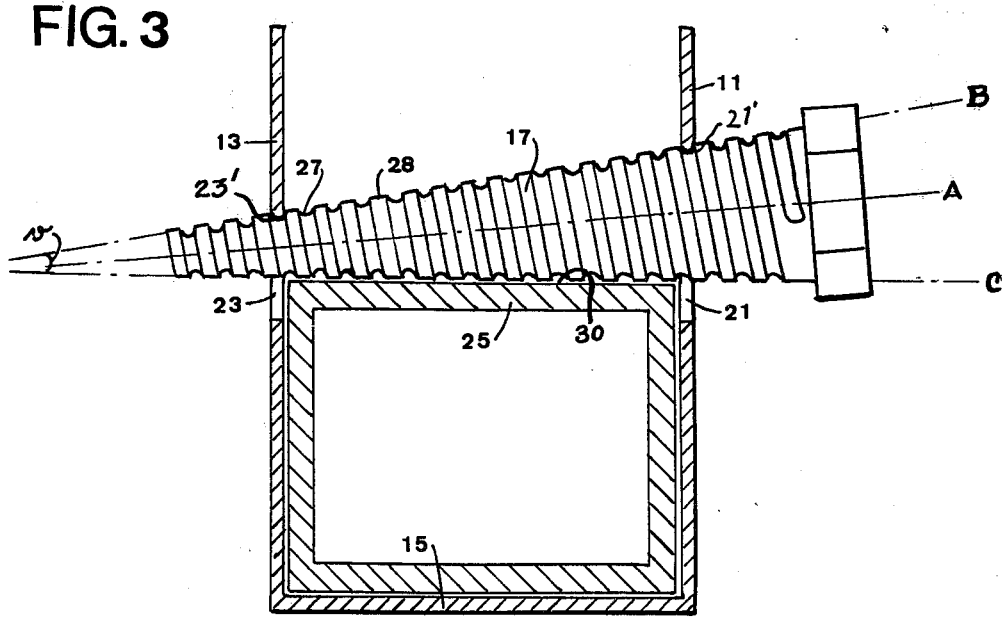
FIG. 3 is a vertical section of the assembly of FIG. 2.
Figure 4:
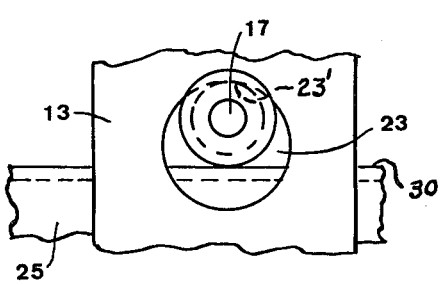
FIGS. 4 and 5 are detail end views showing the interrelationship between plate apertures, and threaded members according to the invention.
Figure 5:
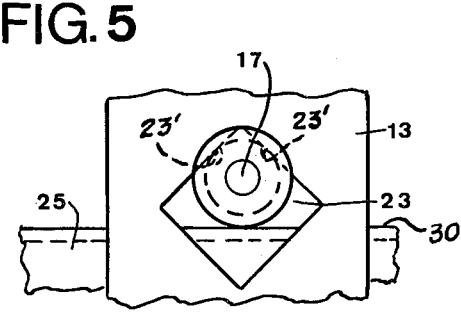
Figure 6:
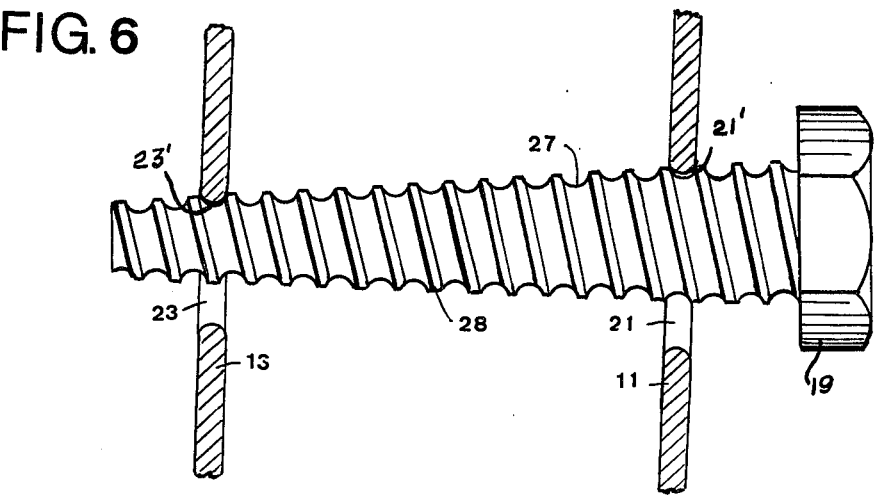
FIGS. 6 through 8 are schematic showings of exemplary alternative configurations of threaded members with cooperating edge means according to the present invention.
Figure 7:
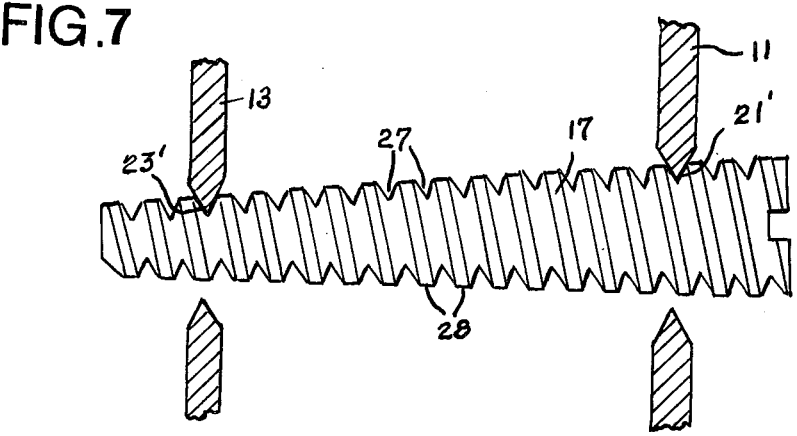
Figure 8:
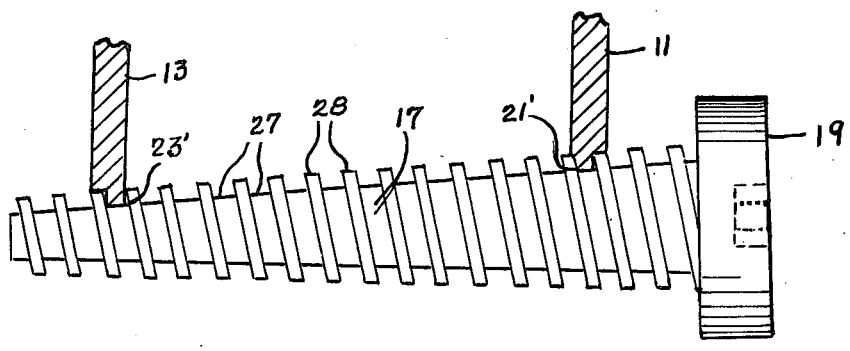

The threaded member 17 may be threaded over substantially its entire length, the thread having a uniform pitch. The distance between the plates 11, 13 is selected depending upon the pitch of the screw thread of the member 17 so that the edge means 23', 21' engage the thread groove 27 simultaneously at opposite portions of the threaded member 17. Since the pitch is uniform, the distance between points of engagement of the member 17 with the means 23', 21' does not change when the member 17 is being turned. The edge means 21', 23', and the groove 27 may have a wide variety of shapes, such as shown in FIGS. 6 through 8. Also, the shape of the apertures 21, 23 may be varied. In FIG. 4, the aperture 23 is shown as circular, however, only a portion of the edge of the aperture 23 comprises the edge means 23'. The smaller the diameter of the circular aperture 23, the greater the area of contact is (the greater the extent of edge means 23'). In FIG. 5, the aperture 23 is shown as diamond-shaped, the edge means 23' comprising two adjacent legs of the aperture 23. In use, normally the major axis A (see FIG. 3) of the member 17 is inclined with respect to a line C perpendicular to the plates 11, 13. The cone angle v preferably is 5 to 10 degrees.

The second structure according to the assembly of the present invention may take a wide variety of forms. For instance, the structure may be generally polygonal in cross section and be received between the two plates 11, 13 such as the tube 25 in FIG. 3, or the tube 33 in FIGS. 9 and 10. For the tube 25, the surface portion 30 comprises an exterior surface of the second structure, while for the tubes 33 of FIGS. 9 and 10, the surface portion 30 comprises edge portions of an aperture(s) passing through the second structure, such as edge portions of the holes 35, 37, or the interior surface of the tube 39 (see FIGS. 9 and 10). The wall thickness of the tube 33 shown in FIG. 9 is greater than the width of the groove 27 so that a surface ridge 28 of the member 17 makes good contact with the surface portion(s) 30. A wear-resistant bush may be inserted in each hole 35, 37 in the FIG. 9 embodiment, or the tube 39 shown in FIG. 10 utilized. The tubes 25, 33 may form parts of building structures, and the device 11, 13, 15 may be adjustable in the longitudinal direction of the tube.

In the embodiment of FIGS. 11 through 14, the cross member 15 has been given a different reference numeral, 41, to indicate that it is part of a larger, integral structure, and it is to be connected to another large structure indicated by reference numeral 43. In the FIGS. 11, 12, and 14 embodiments, the second structure 43 includes at least one leg member having said surface portion 30 associated therewith, which leg member is disposed between the first structure plates 11, 13. In FIG. 11, the leg member may comprise a pair of parallel plates 45, 47, each having a surface portion 30 associated therewith and coaxial holes 49, 51 therein generally corresponding to the holes 35, 37 in the FIG. 9 embodiment. In the FIG. 11 embodiment, however, as opposed to the FIG. 9 embodiment, the threaded member 37 exerts a stretching force upon the structure 43 (with mutual movement of the members 41, 43 towards one another halted by the edges of the plates 11, 13 coming into abutment with the structure 43), instead of pressing the lower part of the legs 45, 47 against the member 41. The FIG. 12 embodiment is similar to the FIG. 11 embodiment except only one leg 53 is provided, with a bore 55 therethrough generally perpendicular to the plates 11, 13.

In the embodiments of FIGS. 3, 9, 10, 11, and 12, a line tangent to the edge means 23', 21' (B in FIG. 3) makes a positive angle with a line (C in FIG. 3) perpendicular to the plates 11, 13. Also, in such embodiments, the surface portion 30 is disposed such that a line in the plane thereof is generally perpendicular to the plates 11, 13. In the FIGS. 13 and 14 embodiments, however, a line tangent to the edge means 23', 21' is perpendicular to the plates 11, 13 and the surface portion 30 is disposed such that a line in the plane thereof makes a cone angle v with the perpendicular to the plates 11, 13. In the FIG. 14 embodiment, like the FIGS. 3 and 9 through 12 embodiments, the surface portion 30 is disposed between the plates 11, 13, and is provided by an edge of the angled cylindrical bore 63 through the legs 53. In the FIG. 13 embodiment, however, the legs 45, 47 straddle the plates 11, 13, the surface portion(s) 30 being disposed exteriorly of the plates 11, 13. In the FIGS. 13 and 14 embodiments, apertures corresponding to apertures 21, 23 have been numbered 57, 59 since such apertures are coextensive (and have substantially the same size). In FIG. 13, the cylindrical angled bores 60, 61 provide the surface portions 30.

The exemplary embodiments shown for the first and second structures are only to be considered exemplary, and not limiting, since a wide variety of other arrangements could be provided. For instance, while it is preferred that the axis A (see FIG. 3) of the threaded member 17 make an angle with respect to a perpendicular to the plates 11, 13 of one half v, the structures could be arranged such that the axis A was perpendicular to the plates 11, 13 and the line B between edge means 21', 23' and the line C in the plane of the surface portion 30 each made an angle of one half v with the line A.

Operation

Figure 2:
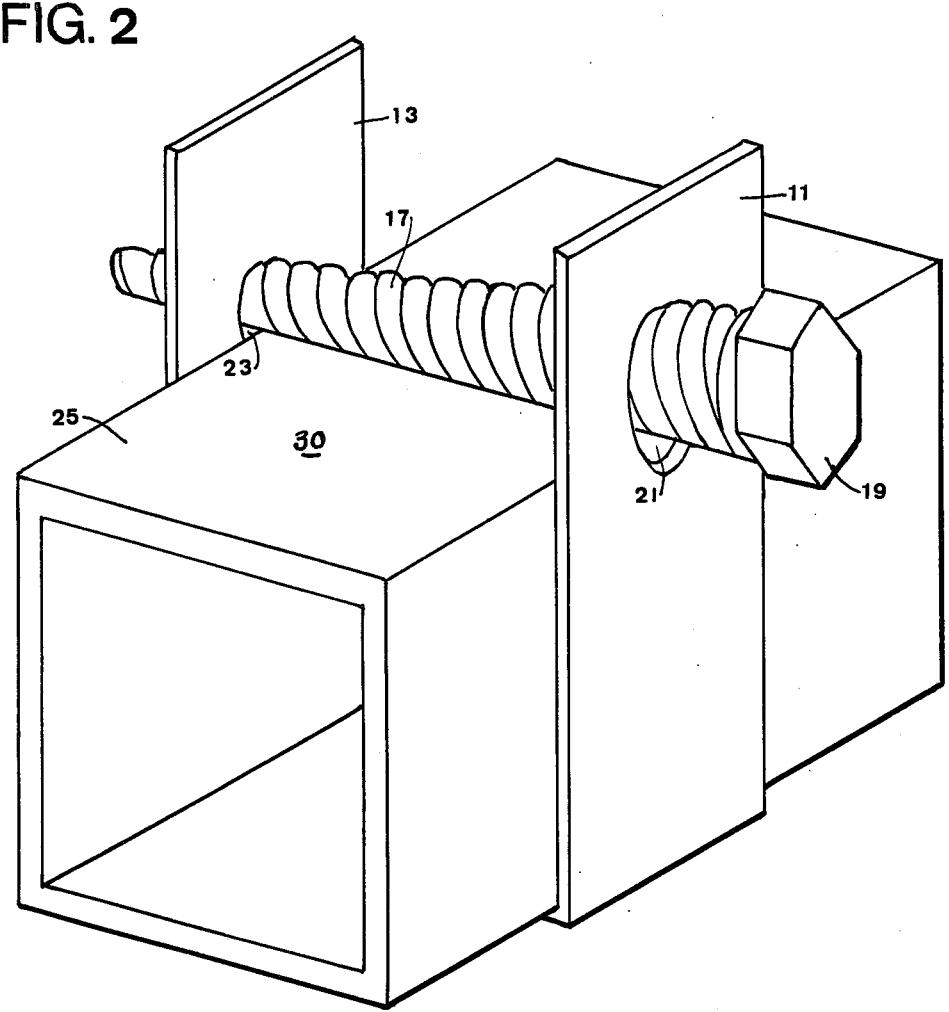
FIG. 2 is a perspective view of an attachment assembly according to the invention, utilizing the attachment device of FIG. 1.

The attachment device and assembly according to the present invention having been described, and exemplary mode of operation thereof will now be set forth. With reference to FIGS. 1 through 3, the second structure 25 is placed between the plates 11, 13 in abutting engagement with the plates 11, 13 and/or the cross member 15. The threaded member 17 is then inserted through the apertures 21, 23. Initially, since the apertures 21, 23 are substantially larger than the corresponding cross-sectional areas of the member 17, it could be passed through the apertures without turning, the shank of the member 17 sliding over the tube 25. When the thread ridge 28 hits the edge means 21' and/or 23', further axial displacement of the member 17 is only possible by rotation. Upon rotation of the head 19, there is further longitudinal displacement of the member 17, the edge means 21', 23' cooperating with the groove 27 of the member 17. The member 17 will then apply reaction forces to both the edge means 21', 23' and the surface portion 30 tending to force such edge means and surface portion apart, whereby after a few turns of the member 17 the lower surface of the tube 25 will be firmly clamped against the web 15. The flattened edges 28 of the member 17 facilitate sliding movement of the member 17 with respect to the surface portion 30 so that the surface portion 30 is not damaged. To dismantle the arrangement it is merely necessary to unscrew the member 17 a few turns until there is play between it and the apertures 21, 23 whereby the member 17 can be retracted without further rotation.

Thus, it will be seen that the device and assembly according to the present invention are simple and easy to use, yet effect reliable, secure attachment between a wide variety of structural members. While the invention has been herein shown and described in what is presently conceived to be the most practical preferred embodiment thereof, it will be apparent to those of ordinary skill in the art that many modifications may be made thereof within the scope of the invention, which scope is to be accorded the broadest interpretation of the appended claims so as to encompass all equivalent structures and devices. What is claimed is:

1. An assembly comprising
a first structure including first and second substantially parallel spaced apart plates; means defining an aperture in each of said first and second plates having a given area, said aperture defining means including edge means for each of said first and second apertures having a thickness for engaging within the grooves of a conically threaded member and allowing longitudinal displacement of such threaded member upon rotation thereof when in engagement with said edge means; a line perpendicular to said plates passing through both said first and second apertures;
a second structure operatively abutting said first structure and having a generally planar surface portion, a line in the plane of said surface portion passing through both said first and second apertures;
means for attaching said first and second structures together so that substantial relative movement therebetween is prevented by applying forces to said edge means and surface portion tending to push said surface portion and edge means apart, said means comprising a conically shaped, conically threaded member having a given cone angle and uniform pitch, and adapted to engage said edge means and to operatively abut said surface portion, said member being longer than the distance between said parallel plates, and said threaded member having flattened thread ridges;
said first aperture shaped to receive said threaded member and having an area substantially larger than at least the smallest cross-sectional area of said member, and said second aperture shaped to receive said threaded member and having an area larger than the cross-sectional area of said threaded member portion adjacent thereto when a portion of the threaded member is received by said first aperture, said first and second apertures being spaced apart a distance corresponding to a multiple of said threaded member pitch; and
the angle formed between a line tangent to said edge means, and a line in the plane of said surface portion, being equal to said cone angle of said threaded member.

2. An assembly as recited in claim 1 wherein said threaded member is threaded over substantially its entire length.

3. An assembly as recited in claim 1 wherein a line tangent to said edge means makes a positive angle with a line perpendicular to said plates.

4. An assembly as recited in claim 3 wherein a line in the plane of said surface portion is perpendicular to said plates.

5. An assembly as recited in claim 1 wherein a line in the plane of said surface portion makes a positive angle with a line perpendicular to said plates.

6. An assembly as recited in claim 1 wherein said cone angle is between 5°–10°.

7. An assembly as recited in claim 1 wherein said second structure is generally polygonal in cross section and abuts both of said plates, being received between said plates.

8. An assembly as recited in claim 7 wherein said surface portion comprises an exterior surface of said second structure.

9. An assembly as recited in claim 7 wherein said surface portion comprises edge portions of an aperture passing through said second structure.

10. An assembly as recited in claim 1 wherein said first and second apertures are substantially circular.

11. An assembly as recited in claim 1 wherein said first and second apertures are diamond-shaped, each of said edge means comprising two adjacent legs of each of said apertures.

12. An assembly as recited in claim 1 wherein said second structure includes at least one leg member, having said surface portion associated therewith, disposed between said first structure plates.

13. An assembly as recited in claim 1 wherein said second structure comprises a pair of leg members, each having a said surface portion associated therewith, and spaced apart a large enough distance so that they straddle said first structure plates.

14. An assembly as recited in claim 1 wherein said first structure includes a cross-member rigidly interconnecting said plates.

15. An attachment device comprising first and second substantially parallel spaced apart plates with a cross-member rigidly interconnecting the plates, means defining an aperture in each of said first and second plates having a given area, a line perpendicular to said plates passing through both apertures, a conically shaped, conically threaded member having a given cone angle and uniform pitch, and being longer than the distance between said first and second plates, said aperture defining means including edge means having a thickness for engaging within the grooves of said threaded member and allowing longitudinal displacement of said threaded member upon rotation thereof when in engagement with said edge means, said first aperture shaped to receive said threaded member and having an area substantially larger than at least the smallest cross-sectional area of said member, and said second aperture shaped to receive said threaded member and having an area larger than the cross-sectional area of said threaded member portion adjacent thereto when a portion of said threaded member is received by said first aperture, said cross-member dimensioned so that said first and second apertures are spaced apart a distance corresponding to a multiple of said threaded member pitch, and the angle formed between a line tangent to said edge means, and a line passing through one of said edge means and perpendicular to said plates, being between 0° and said cone angle.

16. An assembly comprising a first structure including first and second substantially parallel spaced apart plates; means defining an aperture in each of said first and second plates having a given area, said aperture defining means including edge means for each of said first and second apertures for engaging grooves of a conically threaded member and allowing longitudinal displacement of such threaded member upon rotation thereof when in engagement with said edge means; a line perpendicular to said plates passing through both said first and second apertures, and said first and second apertures being diamond-shaped, each of said edge means comprising two adjacent legs of each of said apertures;

a second structure operatively abutting said first structure and having a generally planar surface portion, a line in the plane of said surface portion passing through both said first and second apertures;

means for attaching said first and second structures together so that substantial relative movement therebetween is prevented by applying forces to said edge means and surface portion tending to push said surface portion and edge means apart, said means comprising a conically shaped, conically threaded member having a given cone angle, and adapted to engage said edge means and to operatively abut said surface portion, said member being longer than the distance between said parallel plates;

said first aperture shaped to receive said threaded member and having an area substantially larger than at least the smallest cross-sectional area of said member, and said second aperture shaped to receive said threaded member and having an area larger than the cross-sectional area of said threaded member portion adjacent thereto when a portion of the threaded member is received by said first aperture; and the angle formed between a line tangent to said edge means, and a line in the plane of said surface portion, being equal to said cone angle of said threaded member.

* * * * *